United States Patent
Leman et al.

(10) Patent No.: US 6,722,349 B2
(45) Date of Patent: Apr. 20, 2004

(54) EFFICIENT INTERNAL COMBUSTION ENGINE VALVE ACTUATOR

(75) Inventors: Scott A. Leman, Eureka, IL (US); Sean O. Cornell, Gridley, IL (US)

(73) Assignee: Caterpillar Inc, Peoria, IL (US)

(*) Notice: Subject to any disclaimer, the term of this patent is extended or adjusted under 35 U.S.C. 154(b) by 95 days.

(21) Appl. No.: 10/066,822

(22) Filed: Feb. 4, 2002

(65) Prior Publication Data

US 2003/0145838 A1 Aug. 7, 2003

(51) Int. Cl.⁷ ............................. F02M 25/07; F01L 1/34
(52) U.S. Cl. ................ 123/568.14; 123/90.16; 123/90.22
(58) Field of Search .................. 123/90.11, 90.12, 123/90.13, 90.14, 90.15, 90.16, 90.17, 90.18, 568.14, 320, 321, 322, 347, 348, 490; 251/129.03, 129.1

(56) References Cited

U.S. PATENT DOCUMENTS

| | | |
|---|---|---|
| 4,020,809 A | 5/1977 | Kern et al. |
| 4,180,035 A | 12/1979 | Saiki et al. |
| 4,424,790 A | 1/1984 | Curtil |
| 4,474,008 A | 10/1984 | Sakurai et al. |
| 4,572,114 A | 2/1986 | Sickler |
| 5,012,778 A | 5/1991 | Pitzi |
| 5,191,867 A | 3/1993 | Glassey |
| 5,193,495 A * | 3/1993 | Wood, III ............... 123/90.12 |
| 5,255,641 A | 10/1993 | Schechter |
| 5,333,456 A | 8/1994 | Bollinger |
| 5,335,633 A | 8/1994 | Thien |
| 5,379,743 A | 1/1995 | Stokes et al. |
| 5,456,222 A | 10/1995 | Schechter |
| 5,479,890 A | 1/1996 | Hu et al. |
| 5,520,161 A | 5/1996 | Klopp |
| 5,546,914 A | 8/1996 | Scheinert |
| 5,549,095 A | 8/1996 | Goto et al. |
| 5,586,531 A | 12/1996 | Vittorio |
| 5,611,204 A | 3/1997 | Radovanovic et al. |
| 5,619,965 A | 4/1997 | Cosma et al. |
| 5,645,030 A | 7/1997 | Letsche |
| 5,682,854 A | 11/1997 | Ozawa |
| 5,718,199 A | 2/1998 | Hu et al. |
| 5,724,939 A | 3/1998 | Faletti et al. |
| 5,778,674 A | 7/1998 | Kimura |
| 5,787,859 A | 8/1998 | Meistrick et al. |
| 5,809,964 A | 9/1998 | Meistrick et al. |
| 5,813,231 A | 9/1998 | Faletti et al. |
| 5,937,807 A | 8/1999 | Peters et al. |
| 5,967,115 A | 10/1999 | Konopka et al. |
| 6,000,374 A | 12/1999 | Cosma et al. |
| 6,003,316 A | 12/1999 | Baert et al. |
| 6,012,424 A | 1/2000 | Meistrick |
| 6,035,639 A | 3/2000 | Kolmanovsky et al. |
| 6,035,640 A | 3/2000 | Kolmanovsky et al. |
| 6,067,800 A | 5/2000 | Kolmanovsky et al. |
| 6,067,946 A | 5/2000 | Bunker et al. |

(List continued on next page.)

FOREIGN PATENT DOCUMENTS

WO     WO 99/42718     8/1999

*Primary Examiner*—Willis R. Wolfe
(74) *Attorney, Agent, or Firm*—Marshall, Gerstein, Borun

(57) ABSTRACT

An engine with an efficient valve actuator is disclosed. The engine employs a first force to hold a valve of the engine open during a normal valve event and a second force to hold the exhaust valve open during an exhaust gas recirculation event. The valve actuator may be operated using pressurized fluid adapted to extend an actuator plunger through a cylinder. The first force may be derived by a mechanically driven actuator, while the second force may be derived from a high pressure rail of the engine. A control valve may be employed to direct either low pressure or high pressure oil to the valve actuator cylinder.

32 Claims, 6 Drawing Sheets

U.S. PATENT DOCUMENTS

| | | |
|---|---|---|
| 6,076,353 A | 6/2000 | Freudenberg et al. |
| 6,082,328 A | 7/2000 | Meistrick et al. |
| 6,095,127 A | 8/2000 | Kolmanovsky et al. |
| 6,128,902 A | 10/2000 | Kolmanovsky et al. |
| 6,129,073 A * | 10/2000 | Yamakado et al. ......... 123/490 |
| 6,148,778 A | 11/2000 | Sturman |
| 6,178,749 B1 | 1/2001 | Kolmanovsky et al. |
| 6,189,504 B1 | 2/2001 | Israel et al. |
| 6,244,257 B1 | 6/2001 | Hu |
| 6,302,069 B1 | 10/2001 | Moyer |
| 6,390,037 B2 * | 5/2002 | Di Lieto et al. ......... 123/90.11 |
| 2001/0002379 A1 | 5/2001 | Schechter |

* cited by examiner

EFFICIENT INTERNAL COMBUSTION ENGINE VALVE ACTUATOR

TECHNICAL FIELD

This disclosure relates generally to internal combustion engines and, more particularly, to engine valve actuators.

BACKGROUND

Exhaust gas recirculation is a well known concept among internal combustion engine manufacturers. Taking a four stroke diesel engine as an example, one of ordinary skill in the art will readily recognize that such engines operate through four distinct strokes of a piston reciprocating through a cylinder. In an intake stroke, the piston descends through the cylinder while an intake valve is open. The resulting vacuum draws air into the cylinder. In a subsequent compression stroke, the piston reverses direction while the intake valve and an exhaust valve are closed, thereby compressing the air within the cylinder. This is followed by a combustion or power stroke wherein fuel is injected into the compressed air and thereby is ignited, with the resulting force pushing the piston again in the descending direction while both the intake and exhaust valves are closed. Finally, the piston reverses direction with the exhaust valve open, thereby pushing the combustion gases out of the cylinder.

One known disadvantage of such engine operation stems from the byproducts of the combustion process. More specifically, an unacceptably high level of pollutants, such as nitrous oxide (NOx), may be released during the exhaust stroke. Exhaust gas recirculation (hereinafter referred to as "EGR") attempts to curtail such drawbacks of conventional engine operation. With EGR, at least a portion of the exhaust gases, and thus a portion of the combustion byproducts, is not exhausted to atmosphere, but rather is introduced back into the engine cylinder to be combusted in subsequent power or combustion strokes of the engine.

EGR can be performed internally or externally. With external EGR, a conduit or other form of pathway is provided to direct the exhaust gases expelled through the exhaust valve back to the intake valve. While effective, such an approach requires additional engine components, including the aforementioned conduit, thereby increasing weight and size requirements and decreasing efficiency.

With internal EGR, such conduits and additional engine components are avoided. Rather, the exhaust gases expelled through the exhaust valve are re-introduced to the cylinder through the exhaust valve itself. Such a process requires the exhaust valve to stay open not only through the exhaust stroke, but also after the piston reverses direction, thereby creating a vacuum and drawing a portion of the exhaust gases back into the cylinder through the still open exhaust valve.

One of ordinary skill in the art will readily appreciate that the force required to open the exhaust valve, and maintain the exhaust valve in an open position as the piston reciprocates through the cylinder to a top dead center location, is substantial. Conventionally, the exhaust valve has been held in such an open position by a valve actuator employing highly pressurized oil. More specifically, a valve actuator, having a cylinder in which a piston is reciprocatingly disposed, is provided proximate a stem of the exhaust valve. Movement of the actuator piston, by the highly pressurized oil, to an extended position imparts opening force to the valve stem.

In order to allow for internal EGR, pressurized oil on the order of, for example, fifteen hundred to five thousand pounds per square inch (10.34 to 34.4 MPa) has had to be supplied to the valve actuator (other pressure ranges are possible). The engine or machine in which the engine has been mounted therefore has had to provide a high pressure source or rail and be able to supply the high pressure oil to the actuator when EGR is desired. Such a requirement has, among other things, the disadvantage of decreasing the engine efficiency in that the engine must continually direct substantial usable work to the high pressure rail to maintain such pressures even though the high pressure oil is only required for a relatively short duration during engine operation.

The present disclosure is directed to overcoming one or more of the problems or disadvantages associated with the prior art.

SUMMARY

In accordance with one aspect of the disclosure, an engine valve assembly is provided which comprises an engine valve seat, an engine valve element adapted to move relative to the engine valve seat between an open position and a closed position, and an actuator operatively associated with the valve element and adapted to impart a first force having a first magnitude to the valve element, and a second force having a second magnitude greater than the first magnitude to the valve element to move the valve element.

In accordance with another aspect of the disclosure, an engine valve actuator is provided which comprises an actuator cylinder, an actuator piston reciprocatingly mounted in the actuator cylinder, the piston including a rod extending therefrom, a first source of pressurized fluid, a second source of pressurized fluid, the second source being pressurized at a higher pressure than the first source, and a control valve in fluid communication with the first source, the second source, and the actuator cylinder. The control valve has a first position and a second position, with the first position connecting the first source in fluid communication with the actuator cylinder, and the second position connecting the second source in fluid communication with the actuator cylinder.

In accordance with another aspect of the disclosure, an engine is provided which comprises an engine cylinder, an engine piston reciprocatingly disposed in the engine cylinder, a valve element disposed in a port of the engine cylinder, a valve actuator connected to the engine and positioned proximate the valve stem, a first source of pressurized fluid in fluid communication with the valve actuator, a second source of pressurized fluid in fluid communication with the valve actuator, and a control valve adapted to control flow of pressurized fluid from the first and second sources of pressurized fluid to the valve actuator.

In accordance with another aspect of the disclosure, a method of controlling an engine is provided which comprises providing an engine having an engine cylinder, a valve port, and a valve adapted to open and close the valve port, opening the valve with a first force derived from a first source, holding the valve open with a second force derived from a second source, expelling exhaust gas from the engine cylinder during the opening step, and drawing exhaust gas into the engine cylinder during the holding step.

DETAILED DESCRIPTION

Figure 1:
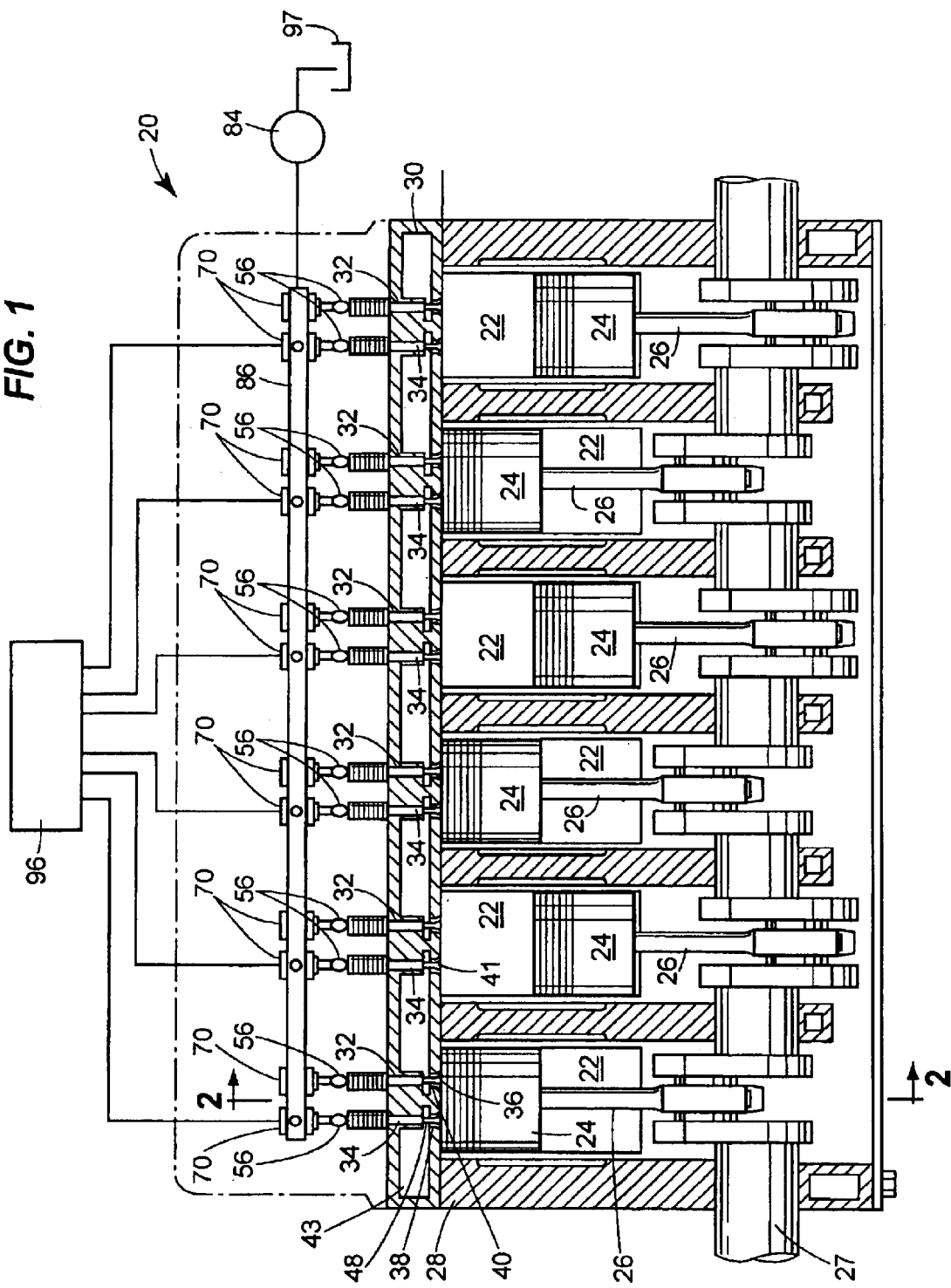
FIG. 1 is a diagrammatic cross-sectional view of an embodiment of an internal combustion engine depicting an engine block, cylinder head, and valve actuators.

Referring now to the drawings, and with specific reference to FIG. 1, an engine is generally referred to by reference numeral 20. While the engine 20 is depicted and will be described in further detail herein with reference to a four stroke, diesel engine, it is to be understood that the teachings of the invention can be employed in conjunction with any other type of engine wherein portions of exhaust gases are to be reintroduced to the engine for substantial combustion.

The engine 20 may include a plurality of engine cylinders 22 in each of which is reciprocatingly mounted an engine piston 24. In the depicted embodiment, six such engine cylinders 22 and engine pistons 24 are depicted in aligned fashion, but it is to be understood that a greater or lesser number are possible, and that engine cylinder orientations other than in-line, such as, for example, a "V" configuration, are possible as well. A connecting rod 26 may be connected to each cylinder piston 24, and in turn be connected to a crank shaft 27 so as to capitalize on the motion of the engine piston 24 to produce useful work in a machine (not shown) with which the engine 20 is associated. Each engine cylinder 24 may be provided within an engine block 28 having a cylinder head 30, and may further include intake valves 32, and exhaust valves 34.

Figure 2:
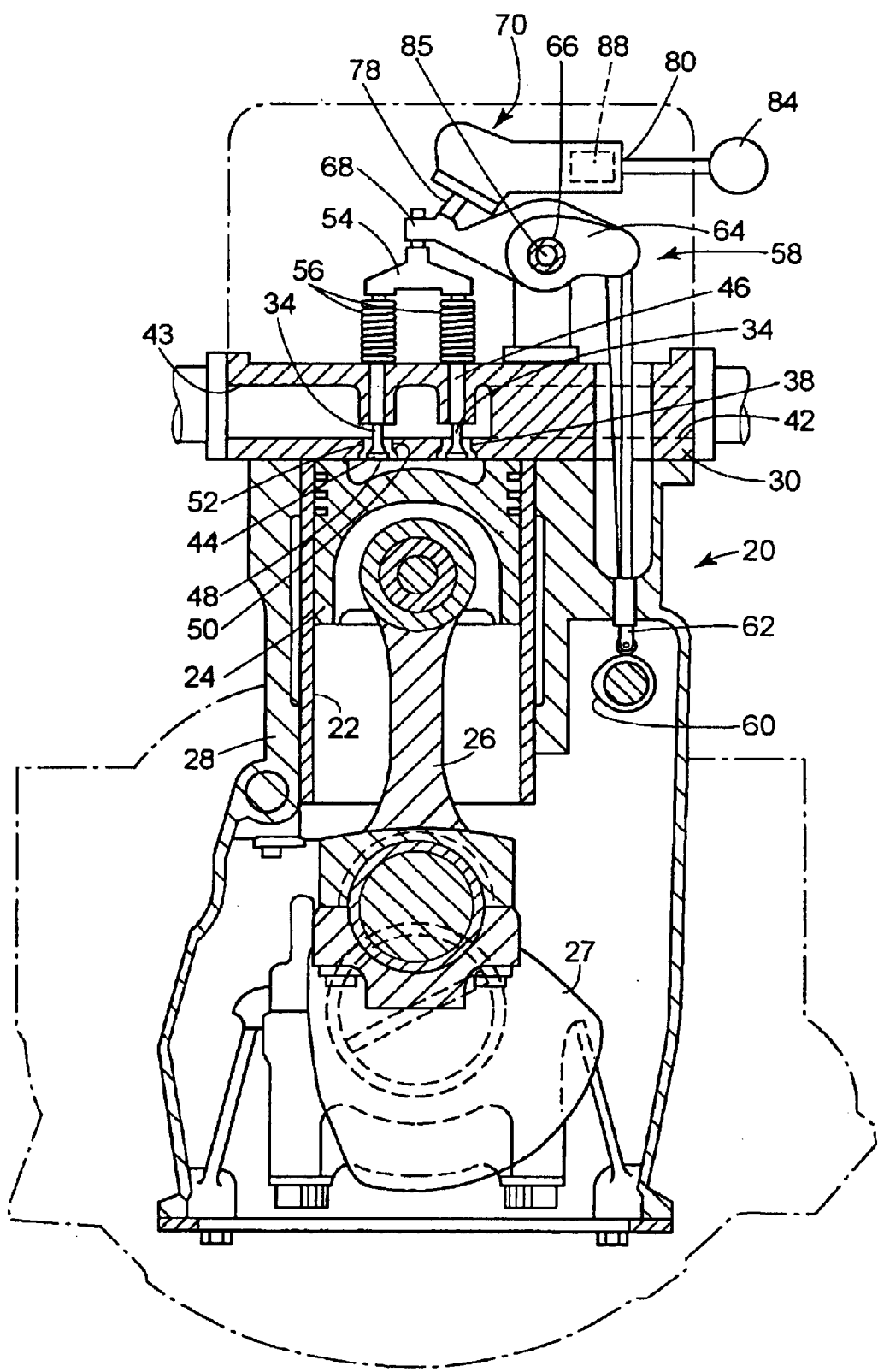
FIG. 2 is a cross-sectional view of the engine of FIG. 1, taken along line 2—2 of FIG. 1.

Referring now to FIGS. 2–5, the cylinder head 30 and a pair of exhaust valves 34 are shown in greater detail for one of the cylinders 22, it being understood that a pair of intake valves 32 associated with each cylinder 22 may be similarly constructed. As shown therein, a pair of exhaust ports 38 may be provided in the cylinder head 30 to allow for fluid communication into and out of the engine cylinder 22. As shown in FIG. 1, each intake valve 32 is similarly disposed in an intake port 36. More specifically, in normal engine operation, air may be allowed to enter the engine cylinder 22 through the intake ports 36, while combustion or exhaust gases may be allowed to exit the engine cylinder 22 through the exhaust ports 38. An intake valve element 40 may be provided within the intake port 36 (FIG. 1), while an exhaust valve element 41 may be provided within the exhaust port 38 (FIG. 2). An intake manifold 42 is connected to the intake port 36, and an exhaust manifold 43 is connected to the exhaust port 38.

Each of the valve elements 40, 41 may include a valve head 44 from which a valve stem 46 extends. The valve head 44 includes a sealing surface 48 adapted to seal against a valve seat 50 about a perimeter 52 of the valve ports 36, 38.

The valve elements 40, 41 further include a bridge 54 adapted to contact the valve stem 46 associated with each valve port 38. A valve spring 56 imparts force between top of each valve stem 46 and the cylinder head 30, thereby biasing the stem 46 away from the cylinder head 30 and thus biasing the valve head 44 into sealing engagement with the corresponding valve seat 50 to close the intake and exhaust valves 32, 34.

As shown best in FIG. 2, movement of the valve elements 40, 41 is controlled not only by the springs 56, but by a cam assembly 58 as well. As one of ordinary skill in the art will readily recognize, rotation of the cam 60 periodically causes a push rod 62 to rise, thereby causing a rocker arm 64, connected thereto, to pivot about a pivot shaft 66. In so doing, an end 68 of the rocker arm 64 is caused to pivot downwardly and thereby open the exhaust valve elements 41. Under normal engine operation, the cam 60 imparts sufficient force to the valve stem 46 to overcome the biasing force of the springs 56 and thereby push the valve heads 44 away from the valve seats 50, to open the exhaust valves 34.

Figure 3:
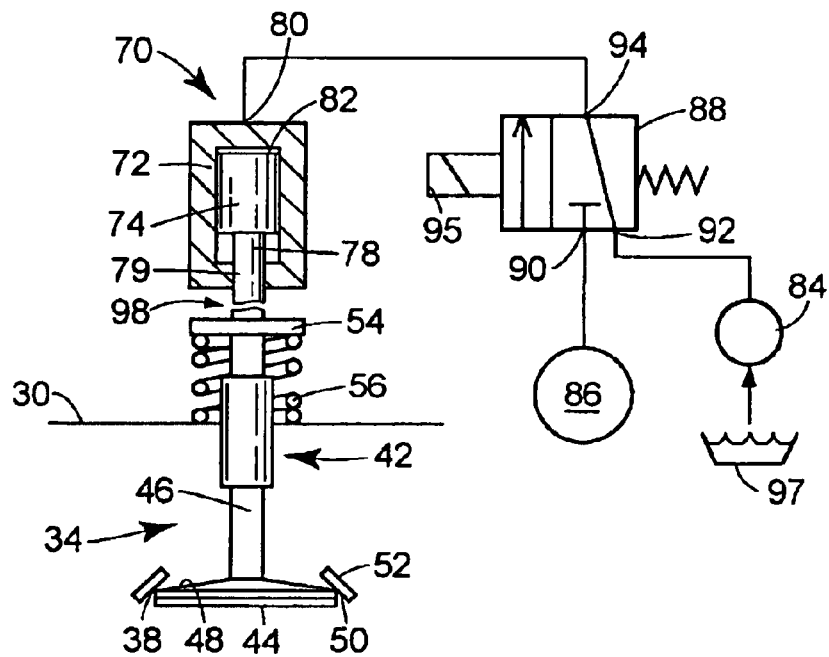
FIG. 3 is a schematic representation of an engine valve actuator depicted in a first position.
Figure 4:
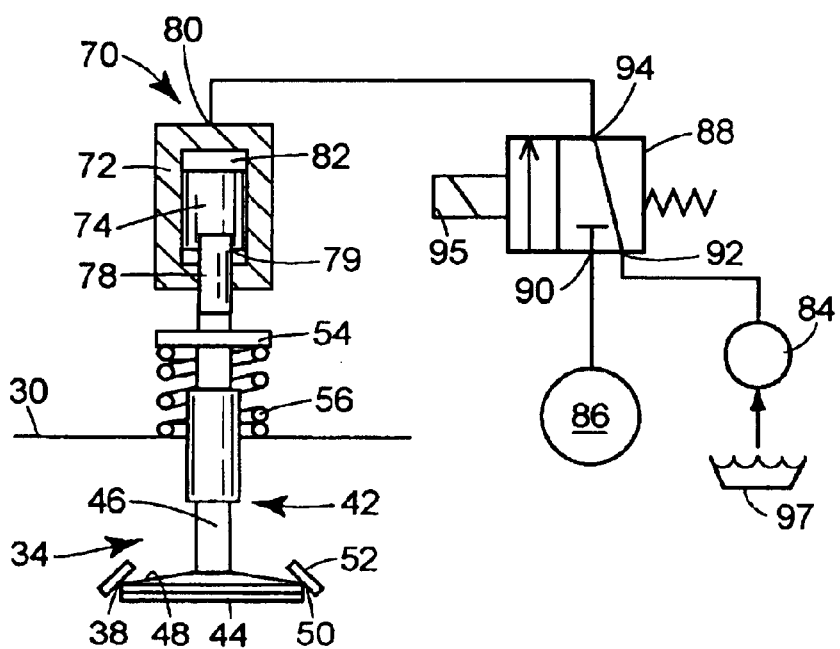
FIG. 4 is a schematic representation of an engine valve actuator depicted in a second position.
Figure 5:
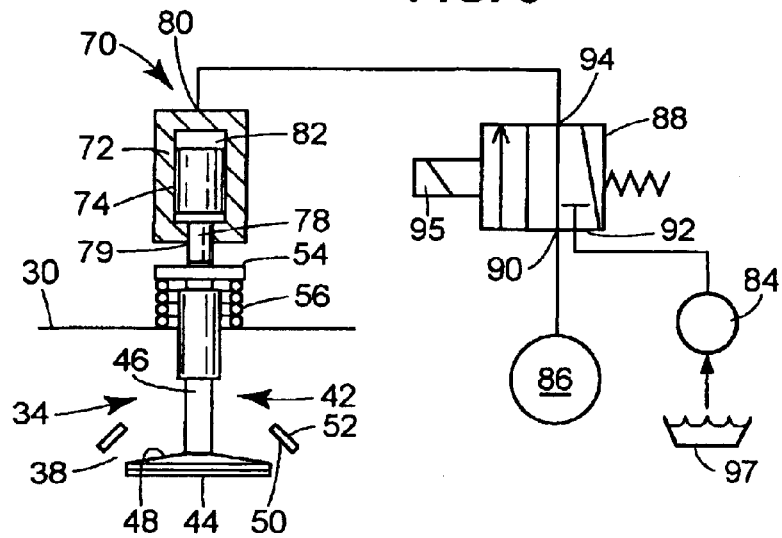
FIG. 5 is a schematic representation of an engine valve actuator depicted in a third position.

In certain modes of engine operation, such as with the internal exhaust gas recirculation to be discussed in further detail herein, the valve stems 46 can be alternatively pushed against the springs 56 to thereby open the valves 34. More specifically, a valve actuator 70 may be used to so open the intake valves 32 and/or the exhaust valves 34. As shown in FIGS. 3–5, one example of the valve actuator 70 includes an actuator cylinder 72 in which an actuator piston 74 is reciprocatingly disposed. The actuator cylinder 72 may include an opening 79, through which an actuator rod 78 may extend in the direction of the rocker arm 64 or bridge 54. The actuator rod 78 may be integral with, or separate from the actuator piston 74.

The actuator cylinder 72 may also include a port 80 providing access to an actuation chamber 82. The port 80 is adapted to place the actuation chamber 82 into fluid communication with one of a low pressure fluid source 84 or a high pressure fluid source 86. In one embodiment, the low pressure fluid source 84 may be a lubrication oil system of the engine 20 normally used to supply lubricating oil to various engine components, and the high pressure fluid source 86 may be a high pressure oil rail of the engine 20 that may also be used to actuate fuel injectors (not shown). Lubrication oil may be supplied from the low pressure fluid source 84 at any convenient portion of the lubrication oil system, such as for example, from a passage 85 within the pivot shaft 86. The low pressure fluid source 84 need not be a lubrication oil system but may be any source of fluid on the order of, for example, sixty to ninety pounds per square inch (413.7 KPa to 620.5 KPa), whereas the high pressure fluid source 86 may be any source of fluid on the order of, for example, fifteen hundred to five thousand pounds per square inch (10.34 to 34.4 MPa). Other pressure ranges are certainly possible.

Placement of one of the low and high pressure sources 84, 86, respectively, into fluid communication with the actuation chamber 82 is controlled by a control valve 88. The control valve 88 may include first and second inlets 90, 92 and a single outlet 94. The control valve 88 may be biased into a position connecting the port 80 to the low pressure oil source 84 and be actuated by a solenoid 95 to connect the port 80 with the high pressure oil source 86. The solenoid 95 may itself be actuated upon receipt of a control signal or the like from a main control or processor 96 (FIG. 1) of the engine 20. Both the low and high pressure sources 84, 86 may be in fluid communication with an oil drain, sump, or accumulator 97.

In either event, the actuation chamber 82 is filled with pressurized fluid. With the low pressure fluid, the fluid fills the chamber 82 sufficiently to move the actuator piston 74 so as to take up any lash 98 (FIG. 3) in the system, such as that existing between the actuator rod 78 and the valve stem 46 or that between the rocker arm 64 and the actuator rod 78. "Taking up any lash in the system" is defined herein to mean removing any space between movable components. In so doing, when exhaust gas recirculation is desired the high pressure fluid source 86 can be placed into communication with the chamber 82 and immediately move the piston 74 and stem 46 to an open position, thereby greatly reducing the volume of high pressure fluid required and increasing system responsiveness.

INDUSTRIAL APPLICABILITY

In operation, the engine 20 can be used in a variety of applications. For example, the engine 20 may be provided on board a prime-mover, vehicle or the like, or any type of machine requiring the provision of mechanical or electrical energy. Such machines may include, but are not limited to, earth moving machines, backhoes, graders, rock crushers, pavers, skid-steer loaders, cranes, trucks, and the like.

Figure 6:
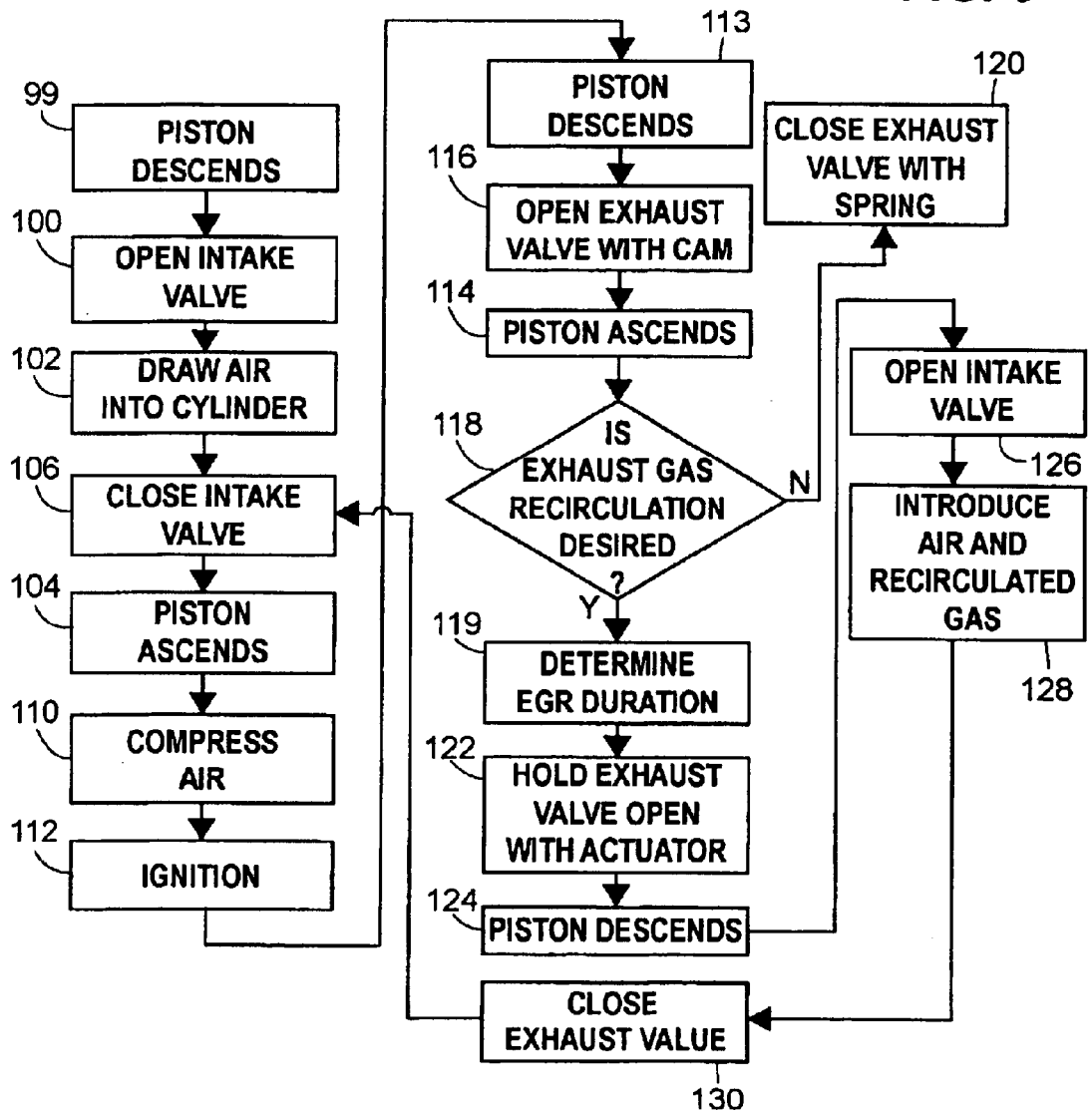
FIG. 6 is a flow chart depicting a sample sequence of steps which may be taken to operate an engine.

Referring now to FIG. 6, in conjunction with FIGS. 2–5, the engine 20 can be operated so as to provide internal EGR in the following manner. By way of background, one of ordinary skill in the art will understand that a typical four-stoke, diesel engine operates through four distinct strokes the engine piston 24 through the engine cylinder 22.

In a first or intake stroke, the engine piston 24 descends through the engine cylinder 22 away from the cylinder head 30 while the intake valve 32 is open, as indicated in steps 99 and 100, respectively. The intake valve 32 may be opened by a mechanical driven actuator such as cam assembly 58. In so doing, air is drawn into the engine cylinder 22, as indicated in a step 102.

In a second or compression stroke, the engine piston 24 reverses its motion, at the direction of the rod 26, while the intake and exhaust valves 32, 34 are closed. Such steps are indicated by reference numerals 104 and 106, respectively in FIG. 6. As the engine piston 24 ascends through the engine cylinder 22 toward the cylinder head 30, the air is compressed (as indicated by a step 110).

In a third or combustion stroke, fuel is injected directly into the compressed air and thereby ignited, as indicated by a step 112. The resulting explosion and expanding gases push the engine piston 24 again in a descending direction (as indicated by a step 113) through the engine cylinder 22, while the intake and exhaust valves 32, 34 remain closed.

In a fourth or exhaust stroke, the engine piston 24 again reverses and ascends through the engine cylinder 22, but with the exhaust valve 34 open, thereby pushing the combustion gases out of the engine cylinder 22. Such steps are indicated in FIG. 6 as steps 114 and 116, respectively.

Figure 7:
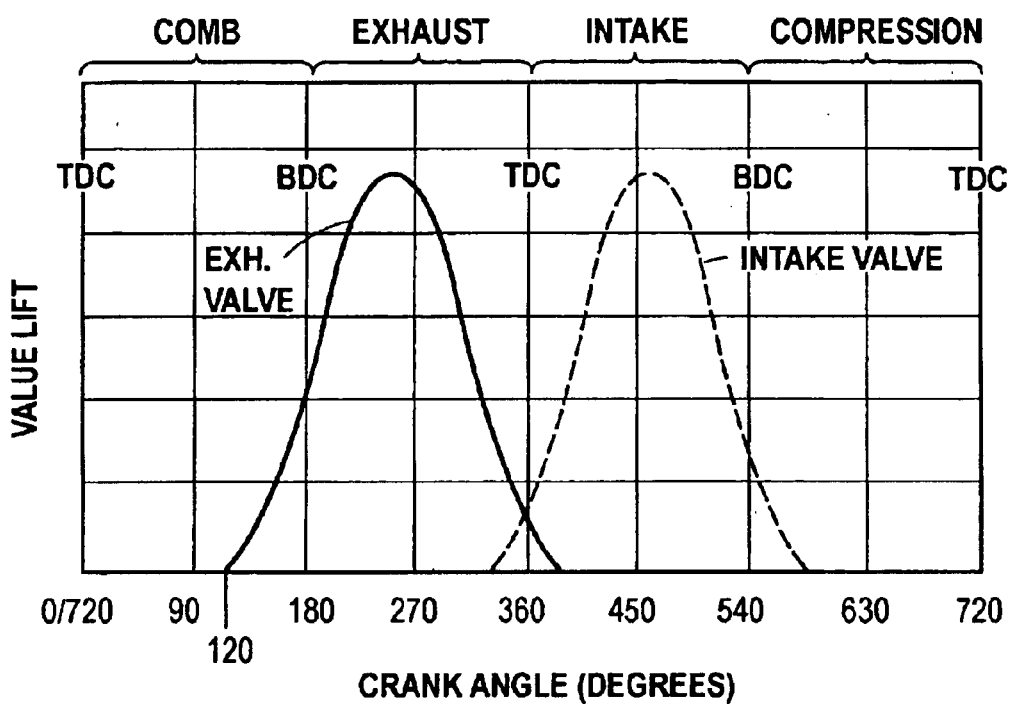
FIG. 7 is a graphical representation of normal valve operation, plotting valve lift vs. engine crank angle, for a four stroke internal combustion engine.
Figure 8:
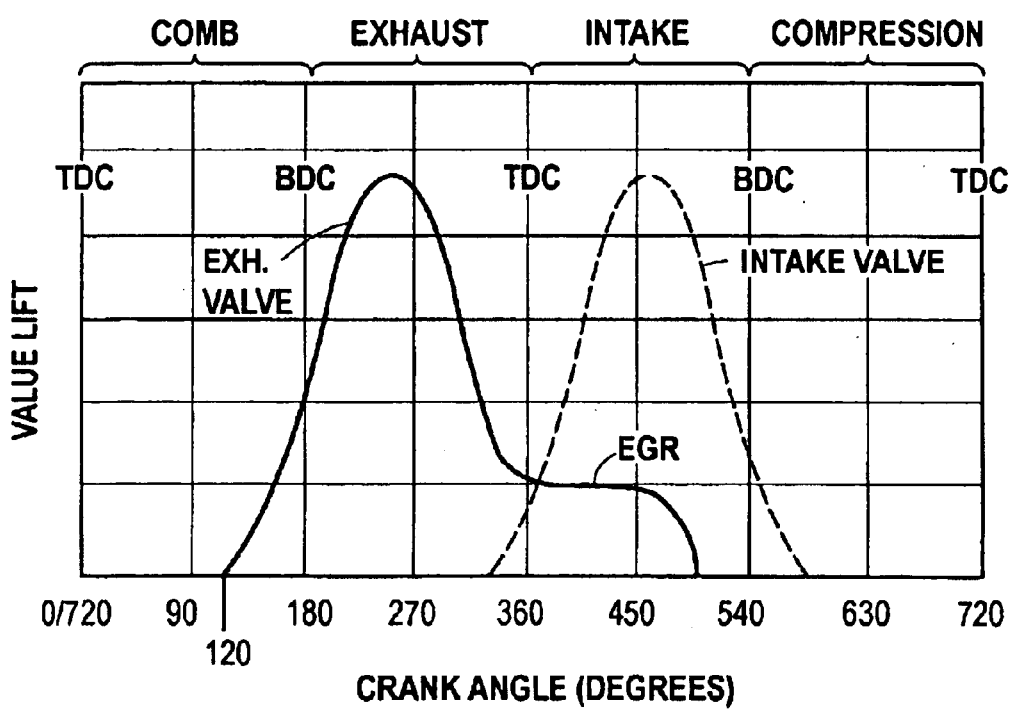
FIG. 8 is a graphical representation of engine operation for an engine providing exhaustion gas recirculation using the exhaust valve.

With internal EGR, the above-referenced valve timing is altered. During a typical exhaust stroke as depicted in the graph of FIG. 7, wherein a four stroke engine cycle is equated to seven hundred and twenty degrees of rotation with each of the four strokes representing one hundred and eighty degrees of rotation, the exhaust valve 34 is closed upon to the engine piston 24 reaching the top dead center position within the engine cylinder 22 (defined herein as an uppermost position the engine piston 24 can attain within the engine cylinder 22 before descending) to, among other things, avoid damaging contact between the engine piston 24 and the extended, open, exhaust valve 34. However, with internal EGR it is necessary for the exhaust valve 34 to remain open throughout not only the exhaust stroke, but during the interim period between when the exhaust valve 34 is normally closed and when the intake valve 32 opens to conduct the intake stroke. FIG. 8 depicts such operation.

Preferably, the exhaust valve 34 is not open as much during EGR as during the exhaust stroke so as to avoid the aforementioned contact. For example, during a typical exhaust stroke, the valve head 44 may be extended approximately twelve millimeters from the exhaust valve port 38, while during EGR the valve head 44 may be extended from the valve port 38 approximately two millimeters. In one embodiment, the exhaust valve 34 stays open throughout entire exhaust stroke of the engine 20 and until approximately ninety degrees into the intake stroke (five hundred degrees of crank angle in FIG. 8).

Figure 9:
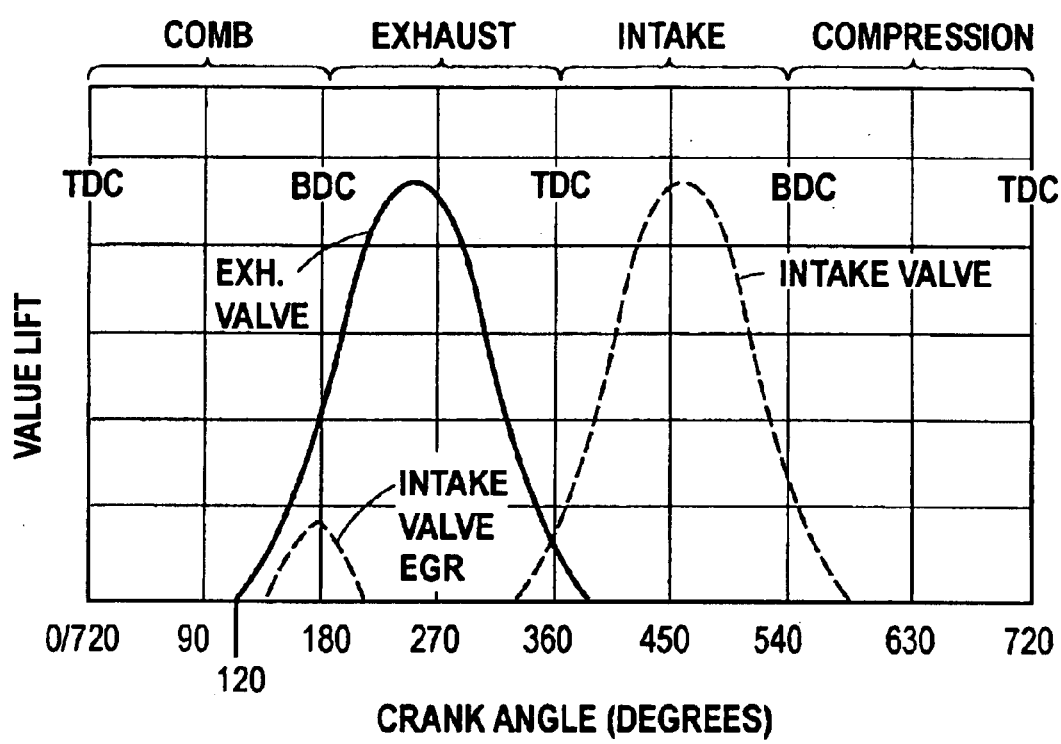
FIG. 9 is a graphical representation of engine operation for an engine providing exhaust gas recirculation using the intake valve.

In an alternative embodiment, EGR can be similarly conducted through the intake valve 32 alone or in combination with the exhaust valve 34. FIG. 9 depicts valve lift of the intake valve 32 during initial stages of the exhaust stroke to accomplish such an alternative form of EGR. Moreover, it is to be understood that, while not illustrated, a third valve or set of valves, separate from the intake valves 32 and the exhaust valves 34, could be provided for the specific purpose of providing EGR.

Since EGR may not always be desired during operation of the engine 20 and the duration of the EGR event may be variable, steps 118 and 119 (FIG. 6) are included wherein the engine 20 or, more specifically, the processor 96, determines first whether EGR is desired and, if so, for how long. If such operation is not desired, normal diesel functioning continues, meaning that the exhaust valve 34 is closed as indicated in a step 120, and a typical four stroke cycle repeats.

However, if EGR is desired, the exhaust valve 34 is held open using the actuator 70, as indicated by a step 122. The exhaust valve 34 is held open while the engine piston 24 descends and the intake valve 32 is opened, as indicated by steps 124 and 126, respectively. It is to be understood that in the aforementioned alternative embodiment, the intake valve 32 can be held open during the latter stages of the exhaust stroke as well to enable EGR through both the intake valve 32 and exhaust valve 34. In so doing, a portion of the exhaust gases pushed from the engine cylinder 22 through the exhaust valve 34 and into the exhaust manifold 43 (and/or intake valve 42) is reintroduced into the engine cylinder 22 (and/or intake valve 32). This step is indicated by referenced numeral 128. Alternatively, the intake valve 32 could be opened as well during the exhaust stroke with exhaust gases being expelled into the intake manifold 42. After a predetermined stroke length (e.g., ninety degrees as indicated above in the embodiment of FIG. 8), the exhaust valve 34 is closed as indicated by a step 130, while the intake valve 32 remains open to complete the intake stroke as explained above.

One of ordinary skill in the art will understand that significant force is required to open and hold the exhaust valve 34 open during the exhaust stroke, due to the ascending engine piston 24 and pressurized gases being pushed out of the exhaust and thus against the exhaust valve 34. The actuator 70, when in fluid communication with the high pressure source 86 is able to generate sufficient force against the actuator piston 74 to hold the valve 34 open. Moreover, by directing high pressure oil to the actuator 70 only when EGR is desired, significant efficiencies in engine operation are achieved in that the engine 20 need not continually compress large amounts of oil to the high pressures needed by the high pressure source 86.

Other aspects and features of the present disclosure can be obtained from a study of the drawings, the disclosure, and the appended claims.

What is claimed is:

1. An engine valve assembly, comprising:
   an engine valve seat;
   an engine valve element adapted to move relative to the valve seat between an open position and a closed position;
   a mechanically driven actuator adapted to move the engine valve element between the closed and open positions; and
   a fluid driven actuator operatively associated with the valve element and adapted to impart a first force having a first magnitude to the valve element, and a second force having a second magnitude greater than said first magnitude to the valve element to move the valve element.

2. An engine valve assembly, comprising:
   an engine valve seat;
   an engine valve element adapted to move relative to the valve seat between an open position and a closed position, the valve element includes a valve stem mechanically coupled with a rocker arm and wherein the actuator includes an actuator piston reciprocatingly disposed within an actuator cylinder, the actuator piston including a rod associated therewith and adapted to engage the rocker arm; and
   an actuator operatively associated with the valve element and adapted to impart a first force having a first magnitude to the valve element, and a second force having a second magnitude greater than said first magnitude to the valve element to move the valve element.

3. The engine valve assembly of claim 2, wherein the actuator cylinder is in fluid communication with first and second sources of pressurized fluid, the second source of pressurized fluid being pressurized at a higher pressure than the first source of pressurized fluid.

4. The engine valve assembly of claim 3, wherein the engine valve assembly further includes a control valve adapted to direct one of the first and second sources of pressurized fluid in fluid communication with the actuator cylinder.

5. An engine valve actuator system, comprising:
   a mechanically driven actuator adapted to move the engine valve element between a closed position and a fully open position;
   a fluid driven actuator having a piston reciprocatingly mounted in an actuator cylinder, the actuator piston including a rod operatively associated therewith;
   a first source of pressurized fluid;
   a second source of pressurized fluid, the second source being pressurized at a higher pressure than the first source; and
   a control valve in fluid communication with the first source, the second source, and the actuator cylinder, the control valve having a first position and a second position, said first position connecting the first source in fluid communication with the actuator cylinder, said second position connecting the second source in fluid communication with the actuator cylinder.

6. The engine valve actuator system of claim 5, wherein the first source of pressurized fluid is a lubrication oil system of an engine.

7. The engine valve actuator system of claim 5, wherein the second source of pressurized fluid is a high pressure oil rail of an engine.

8. The engine valve actuator system of claim 5, wherein the second source of pressurized fluid is at a pressure within the range of about three thousand pounds per square inch to about five thousand pounds per square inch.

9. The engine valve actuator system of claim 5, wherein the control valve is always in fluid communication with one of the first and second sources of pressurized fluid.

10. The engine valve actuator system of claim 5, wherein the control valve is a three-way, two position valve.

11. The engine valve actuator system of claim 5, wherein the fluid driven actuator holds the valve in an intermediate position between the fully open and closed positions.

12. An engine, comprising:
    an engine cylinder;
    an engine piston reciprocatingly disposed in the engine cylinder;
    a valve element disposed in a port of the engine cylinder;
    a mechanically driven actuator adapted to move the valve element between a closed position and a fully opened position;
    a fluid driven valve actuator connected to the engine and positioned proximate the valve stem;
    a first source of pressurized fluid in fluid communication with the fluid driven valve actuator;
    a second source of pressurized fluid in fluid communication with the fluid driven valve actuator; and
    a control valve adapted to control flow of pressurized fluid from the first and second sources of pressurized fluid to the fluid driven valve actuator.

13. The engine of claim 12, wherein the fluid driven valve actuator includes an actuator cylinder and an actuator piston reciprocatingly mounted in the actuator cylinder.

14. The engine of claim 12, including a coil spring mounted about the valve element and biasing the valve element toward the closed position.

15. The engine of claim 12, wherein the first source of pressurized fluid is an engine lubrication system.

16. The engine of claim 12, wherein the fluid driven valve actuator is always in fluid communication with one of the first and second sources of pressurized fluid.

17. The engine of claim 12, wherein the force generated by the first source of pressurized fluid is sufficient to take up lash associated with the valve element and the fluid driven valve actuator.

18. The engine of claim 12, wherein the engine cylinder port is an exhaust port and the valve element is an exhaust valve.

19. The engine of claim 12, wherein the valve element is disposed in an exhaust port of the engine cylinder.

20. The engine of claim 12, wherein the valve element is disposed in an intake port of the engine cylinder.

21. The engine of claim 12, wherein the fluid driven actuator holds the valve in an intermediate position between the fully open and closed positions.

22. A method of controlling an engine, comprising the steps of:
    providing an engine having an engine cylinder, a valve port extending from the engine cylinder, and a valve element adapted to move between a fully open position and a closed position relative to the valve port;
    opening the valve with a first force derived from a first source;

partially closing the valve to an intermediate position between the fully open position and the closed position;

holding the valve in the intermediate open position with a second force derived from a second source;

expelling exhaust gas from the engine cylinder during the opening step;

drawing exhaust gas into the engine cylinder during the holding step;

removing the second force from the valve; and closing the valve.

23. The method of claim 22, wherein the second source is a fluid driven valve actuator having an actuator cylinder in which an actuator piston is reciprocatingly disposed and the holding step includes directing the fluid to the actuator cylinder.

24. The method of claim 22, wherein the first source is a mechanically driven actuator.

25. The method of claim 22, wherein the opening step is performed during an exhaust stroke of the engine, and wherein the holding step is performed during the exhaust stroke and at least part of an intake stroke of the engine.

26. The method of claim 22, including the step of performing the opening step prior to an exhaust stroke of the engine.

27. The method of claim 22, including the steps of holding the valve element open a first predetermined amount during the opening step and a second predetermined amount during the holding step.

28. The method of claim 22, including the steps of opening and holding an exhaust valve.

29. The method of claim 22, including the steps of opening and holding an intake valve.

30. The method of claim 22, wherein the holding step includes a step of switchably connecting a control valve to a source of high pressure fluid and a source of low pressure fluid in fluid communication with the actuator cylinder.

31. The method of claim 30, wherein the holding step includes a step of switchably connecting the control valve to a high pressure rail of the engine and a lubrication oil system of the engine.

32. The method of claim 30, including the step of connecting a source of low pressure fluid with the actuator cylinder during the opening step.

* * * * *